A. SANLADERER.
ELECTRIC LIGHTING APPARATUS FOR VELOCIPEDES.
APPLICATION FILED JUNE 12, 1913.
1,111,864.
Patented Sept. 29, 1914.
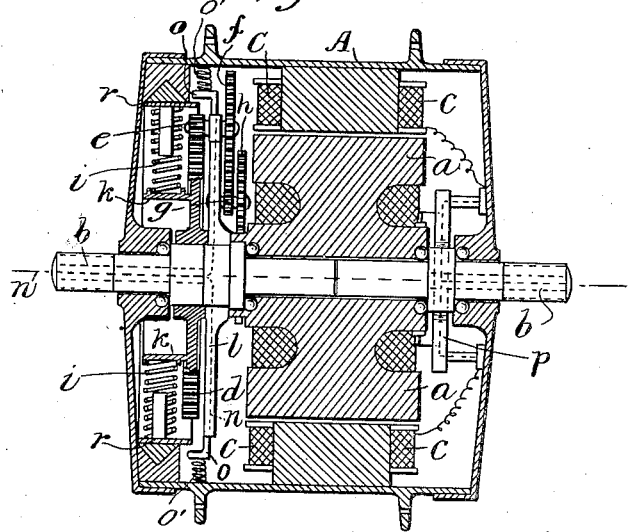
Fig. 1.
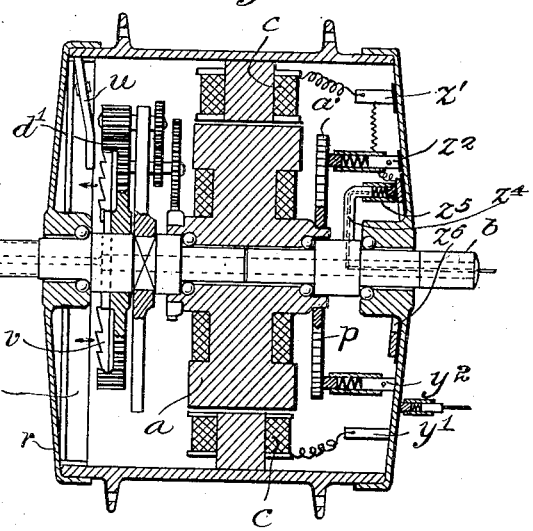
Fig. 2.
Fig. 5.
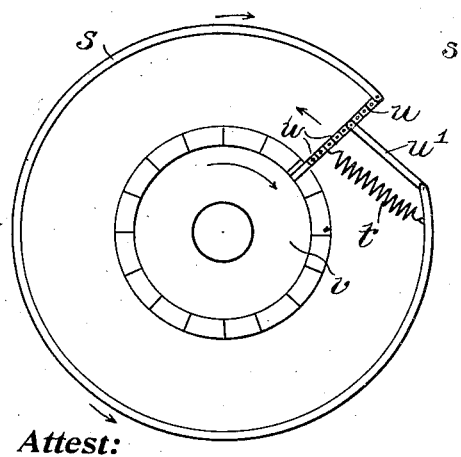
Fig. 3.
Fig. 4.
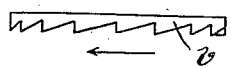
Attest:
Inventor:
Alois Sanladerer
by
Atty

UNITED STATES PATENT OFFICE.

ALOIS SANLADERER, OF ORTENBURG, NEAR VILSHOFEN, GERMANY.

ELECTRIC-LIGHTING APPARATUS FOR VELOCIPEDES.

1,111,864.    Specification of Letters Patent.    Patented Sept. 29, 1914.

Application filed June 12, 1913. Serial No. 773,148.

*To all whom it may concern:*

Be it known that I, ALOIS SANLADERER, a subject of the Emperor of Germany, residing at Ortenburg, near Vilshofen, Bavaria, in Germany, have invented certain new and useful Improvements in Electric-Lighting Apparatus for Velocipedes, of which the following is a specification.

This invention relates to lighting apparatus for velocipedes of the type wherein a dynamo is used, driven by the action of the velocipede itself, with the aid of a spring clutch which slips when the output of the dynamo has increased to a certain predetermined maximum, due to an increase in the speed of the vehicle and a consequent acceleration of the speed of revolution of the dynamo. This regulation provides for a substantially constant current for feeding the lamps or other current consuming apparatus.

It has hitherto been usual to effect the drive by means of a friction wheel at the rim of one of the velocipede wheels. This results in increased wear of the tire, and also involves placing the dynamo in a position where it is exposed to dust, mud and moisture.

The object of the present invention is to obviate these disadvantages. To this end I place the dynamo within the hub of the velocipede wheel with the armature mounted to rotate freely on the axle within the hub, the spring clutch being likewise placed within the hub, to take the drive from the latter.

Two embodiments of the invention are illustrated in the accompanying drawing, in which—

Figure 1 is a section of one embodiment; Fig. 2 is a similar section of the second embodiment; Fig. 3 is a side elevation of certain parts of the construction shown in Fig. 2, and Fig. 4 is a plan view of one of these parts. Fig. 5 is a detail view of the split ring.

Referring in the first instance to Fig. 1, $a$ designates the armature of the dynamo, which is mounted by means of ball bearings on the fixed axle $b$, the field-magnets $c$ being fixed within the hub A, around the armature. The armature is driven by means of a train of gear wheels $d$, $e$, $f$, $g$, $h$. The gear wheel $d$ is loose on the axle $b$, and the wheels $e$, $f$, $g$, $h$, have bearings on a fixed arm $l$. The wheel $h$ gears with a pinion fixed to the armature and the result of the rotation of the hub is to drive the field magnets and the armature in opposite directions, the field magnets being carried by the hub and the armature driven oppositely thereto by means of the intervening gears above described.

Within the hub, at one side of the wheel $d$, there is a plurality of spiral clutch springs $i$, the innermost convolution of each of which bears against a ring $k$ fixed to the wheel $d$. The outermost convolution of each spring exerts a pressure against a ring $r$ bearing against an opposing hub-carried element; said ring $r$ is a split ring, with its ends preferably overlapped as shown by the characters $r^3$ and $r^4$ in Fig. 5. The friction between the springs $i$ and the rings $k$ and $r$, due to the elastic pressure of the springs, is such that at a low speed of the hub the dynamo is driven at a speed sufficient to produce current adequate for lighting. If the speed of rotation of the armature becomes too great, due to the accelerated speed of rotation of the hub the springs permit such a slippage of the clutch as is required to prevent any appreciable increase in the speed of the dynamo.

To allow of putting the clutch out of operation, the hollow radial arms $l$ of a fixture carried by the axle carry the right angled hooks $o$, whose inner ends are attached to a wire $n$ which passes through said hollow arms and through the axle $b$. When the wire $n$ is pulled, the hooks $o$ are drawn radially inward, into contact with the split ring $r$, which is compressed thereby. The springs $i$ are in turn compressed by the ring $r$, so that all pressure is removed from the contacting clutch member $r'$. Said hooks $o$ are held in a normal position of radial extension by means of springs $o'$ connecting said hooks $o$ with the casing A.

In the construction shown in Figs. 2 to 4 the armature, mounted within the hub, is also driven by means of a train of gear-wheels, one of which is designated $d'$ in Fig. 2. Keyed on a boss at the center of this wheel $d'$ is a longitudinal slidable pinion $v$ having lateral ratchet teeth, and serving for driving the wheel. The clutch consists of spring band $s$, bent to form a ring having a gap, and mounted within the hub of the velocipede. To one end of this band is pivoted a lever $u$, connected to the other end of the band by a link $u'$ and by a spring $t$, so that the spring $t$, acting on the lever $u$, expands the ring formed by the band $s$, and presses the latter into frictional engagement with the hub. The lever $u$ has numerous holes $w$ for attachment of the spring $t$ at various distances from its fulcrum. This enables the clutch action to be regulated. The pinion $v$ is connected to a bell crank $x$ (Fig. 2) so that by rocking this bell-crank the pinion can be moved alternatively into and out of engagement with the lever $u$. The latter is thus used in the manner of a pawl for driving the pinion, as shown in Fig. 4 the armature being thus rendered capable of being connected with or disconnected from the hub at will.

If the clutch-band $s$ is driven in the direction indicated by the arrow at the top, in Fig. 3, the pinion $v$ is rotated in the same direction by the lever $u$. Reaction due to the load on the pinion is exerted on the lower end of the lever $u$ in the direction indicated by the arrow in Fig. 4, so that the lever stretches the spring $t$, to a greater or less extent, depending on the speed of the hub. By this means the clutch ring is more or less contracted, so that it slips, and the speed at which the dynamo is driven is approximately uniform, at all normal speeds of the hub.

The following provision is made for taking the current off of the machine. Mounted on the casing, are pins $y'$, $z'$ and $y^2$ and $z^2$, the latter of which are provided with spring pressed contact members, while the former of these said pins, are wired directly to the field coils $c$ $c$ as clearly shown in Fig. 2. The contacts carried by the pins $y^2$ and $z^2$ ride over contact strips of the collector ring $a'$ of the armature $a$. An insulated contact ring $z^6$ electrically connected to the pin $z^2$ has a riding contact with a spring pressed lead wire contact $z^5$, the lead wire passing through the conduit $z^4$ and out through the hollow shaft $b$. The opposite conductor is suitably connected to the casing or some iron portion of the wheel, so that one of the poles is formed by the mass of the material in the machine. The wiring of the collector $a'$, the armature $a$ and the magnet $c$ is the same as in any well known direct current machine.

What I claim as my invention and desire to secure by Letters Patent of the United States is:—

1. The combination with a rotary casing, of an armature mounted for rotation in said casing, a set of field magnets disposed within said casing, and an elastic driving clutch between said casing and armature for driving the latter oppositely to the casing.

2. The combination, with a rotary casing, of an axle within said casing, a dynamo within said casing having an armature rotatable on said axle, and an elastic clutch within said casing and in frictional engagement therewith, adapted to transmit rotation from said casing to said dynamo, for the purpose set forth.

3. The combination, with a rotary casing, of an axle within said casing, a dynamo within said casing having an armature rotatable on said axle, a ratchet pinion for transmitting rotation to said armature, an elastic circularly curved clutch-band within said casing, a lever pivoted to said clutch-band and adapted to engage the teeth of said ratchet pinion, and a spring attached to said lever and to said clutch-band, expanding the latter against the inner surface of the casing, for the purpose set forth.

In testimony whereof I affix my signature in presence of two witnesses.

ALOIS SANLADERER.

Witnesses:
 GEORG FEZZLE,
 DAVID LOPL.